United States Patent
Aiba et al.

(10) Patent No.: US 11,911,944 B2
(45) Date of Patent: Feb. 27, 2024

(54) INJECTION DEVICE AND INJECTION CONTROL METHOD

(71) Applicant: Sodick Co., Ltd., Kanagawa (JP)

(72) Inventors: Shuji Aiba, Kanagawa (JP); Shingo Taniguchi, Kanagawa (JP); Tasuku Okano, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 4 days.

(21) Appl. No.: 17/184,622

(22) Filed: Feb. 25, 2021

(65) Prior Publication Data
US 2021/0268703 A1 Sep. 2, 2021

(30) Foreign Application Priority Data
Feb. 28, 2020 (JP) ................................. 2020-033115

(51) Int. Cl.
| | |
|---|---|
| B29C 45/46 | (2006.01) |
| B29C 45/54 | (2006.01) |
| B29C 45/58 | (2006.01) |
| B29C 45/80 | (2006.01) |

(52) U.S. Cl.
CPC .......... *B29C 45/461* (2013.01); *B29C 45/586* (2013.01); *B29C 45/80* (2013.01); *B29C 45/54* (2013.01)

(58) Field of Classification Search
CPC ........................... B29C 45/586; B29C 45/461
See application file for complete search history.

(56) References Cited

U.S. PATENT DOCUMENTS

| | | |
|---|---|---|
| 5,795,509 A | 8/1998 | Fujikawa et al. |
| 6,284,167 B1 | 9/2001 | Fujikawa |
| 10,792,847 B2 | 10/2020 | Yokoyama |
| (Continued) | | |

FOREIGN PATENT DOCUMENTS

| | | |
|---|---|---|
| JP | S49116156 | 11/1974 |
| JP | S5055666 | 5/1975 |
| (Continued) | | |

OTHER PUBLICATIONS

Machine translation JP2018079689A (Year: 2018).*
(Continued)

*Primary Examiner* — Jacob T Minskey
*Assistant Examiner* — Wayne K. Swier
(74) *Attorney, Agent, or Firm* — JCIPRNET (57) ABSTRACT

Provided is an injection device and an injection control method which are capable of preventing a drooping phenomenon from an injection nozzle even during high cycle molding, and capable of appropriately plasticizing and molding a resin having poor thermal stability. An injection device (10) of the disclosure includes: an injection cylinder (30) which accumulates a molding material and has an injection nozzle (33) at the front; an injection plunger (31) which is moved backward in the injection cylinder (30); an injection plunger driving device (50, 150) which moves the injection plunger (31) backward; and an injection controller (60, 160). The injection controller (60, 160) retreats the injection plunger (31) by the injection plunger driving device (50, 150) to perform metering in a plastication metering step of metering the molding material supplied into the injection cylinder (30).

4 Claims, 7 Drawing Sheets

(56) References Cited

U.S. PATENT DOCUMENTS

| | | |
|---|---|---|
| 2004/0140588 A1 | 7/2004 | Endo |
| 2007/0196530 A1* | 8/2007 | Shiraishi ............... B29C 45/50 425/149 |
| 2010/0025898 A1 | 2/2010 | Pope et al. |
| 2018/0133940 A1 | 5/2018 | Yokoyama |
| 2018/0319065 A1 | 11/2018 | Holm et al. |

FOREIGN PATENT DOCUMENTS

| | | |
|---|---|---|
| JP | S6422525 | 1/1989 |
| JP | H02286314 | 11/1990 |
| JP | H05337993 | 12/1993 |
| JP | H06304979 | 11/1994 |
| JP | H09123241 | 5/1997 |
| JP | H09155942 | 6/1997 |
| JP | H11227013 | 8/1999 |
| JP | 2001062883 | 3/2001 |
| JP | 2001179778 | 7/2001 |
| JP | 2004255588 | 9/2004 |
| JP | 2005343026 | 12/2005 |
| JP | 2007253606 | 10/2007 |
| JP | 6281999 | 2/2018 |
| JP | 2018079593 | 5/2018 |
| JP | 2018079689 A * | 5/2018 |
| JP | 6507108 | 4/2019 |

OTHER PUBLICATIONS

Machine translation JPS49116156 (Year: 1974).*
Machine translation JPH02286314A (Year: 1990).*
Machine translation JPH06304979A (Year: 1994).*
Machine translation JP2001062883A (Year: 2001).*
Machine translation JP2004255588A (Year: 2004).*
"Office Action of Japan Related Application No. 2020-034636", dated Sep. 8, 2020, with English translation thereof, pp. 1-6.
"Office Action of Japan Related Application No. 2020-033115", dated Sep. 16, 2020, with English translation thereof, pp. 1-10.
"Notice of allowance of U.S. Related Application, U.S. Appl. No. 17/167,101", dated Jul. 27, 2023, p. 1-p. 10.

* cited by examiner

INJECTION DEVICE AND INJECTION CONTROL METHOD

CROSS-REFERENCE TO RELATED APPLICATIONS

This application claims the priority benefit of Japanese Patent Application No. 2020-033115, filed on Feb. 28, 2020. The entirety of the above-mentioned patent application is hereby incorporated by reference herein and made a part of this specification.

BACKGROUND

TECHNICAL FIELD

The disclosure relates to an injection device and an injection control method which are characterized in a screw preplasticating injection molding machine in which a plastication unit and an injection unit are separated, and particularly characterized in a plastication metering step.

RELATED ART

Generally, an injection molding machine includes a mold clamping device and an injection device, a mold is opened/closed and tightened by the mold clamping device, and a molding material in a flowable state is injected and filled into a cavity by the injection device via flow paths such as a sprue portion, a runner portion, a gate portion, and the like in the mold. The injection molding machine sequentially performs, for example, in one molding cycle: a mold closing step of closing the mold; a clamping step of tightening the mold; an injection step of injecting and filling the metered molding material in the flowable state into the mold; a solidification step (for example, a cooling step) of solidifying the molding material in the flowable state in the mold; a mold opening step of opening the mold, and a take-out step for taking out a molded product from the mold (for example, a protrusion step). From the start of the solidification step to the start of the injection step, a metering step (for example, a plastication metering step in the case of a thermoplastic resin material) is performed at the same time, in which melting, mixing, and the like are performed according to the molding material and the molding material in the flowable state is metered. In addition, the used molding material also includes a thermoplastic resin material, a thermosetting resin material, a metal material, a liquid resin material, and the like.

For example, an injection device of a plastic injection molding machine which injects and molds a thermoplastic resin material is roughly categorized into an in-line screw injection device or a screw preplasticating injection device, the in-line screw injection device plastically melts the resin material and injects and fills the molten resin by one in-line screw, and in the screw preplasticating injection device, a plastication unit which plastically melts the resin material by a plastication screw and an injection unit which injects and fills the molten resin by an injection plunger are separately arranged. Because the screw preplasticating injection device does not need to have a check ring for preventing backflow in the injection plunger, it is considered that there is no variation in the metering of the molten resin due to delay in closing the ring, and metering precision is good.

This injection device of the injection molding machine includes at least an injection cylinder, an injection plunger arranged to be advanced and retreated freely in the injection cylinder, an injection nozzle in a front portion of the injection cylinder, and an injection chamber which is in a cylinder hole of the injection cylinder and is formed at the front of a distal end surface of the injection plunger. In the plastication metering step, the resin material is plastically molten by shearing heat generated by rotation of the plastication screw and heat generated by a heater and is extruded toward the inside of the injection chamber through a communication passage, and the molten resin receives a predetermined back pressure by retreating the injection plunger and is metered according to a distance that the injection plunger has retreated (Patent literature 1 and Patent literature 2).

Literature of related art
Patent literature
  Patent literature 1: Japanese Patent No. 6281999
  Patent literature 2: Japanese Patent Laid-Open No. 09-123241

SUMMARY

Generally, in the plastication metering step, a back pressure is set to be positive or the back pressure is set to 0 for the injection plunger in order to prevent air from being entrained in the molten resin flowing in the injection cylinder. When the back pressure is set to be positive, a pressure in the injection cylinder rises in the plastication metering step, and a temperature in the injection cylinder rises accordingly. This rise of the temperature in the injection cylinder causes a problem that when a resin having poor thermal stability is used as a material for injection molding, the resin will be decomposed. In addition, when the back pressure of the injection plunger is set to 0, a solidified resin remains in a gap between the injection cylinder and the injection plunger at the rear of the injection plunger as a molding cycle is repeated, and the resin will become a resistance and hinder a rearward movement of the injection plunger. As a result, the pressure and the temperature in the injection cylinder fluctuate, which adversely affects the molten resin.

Furthermore, in high cycle molding, the cooling step is completed and is switched to the mold opening step during the plastication metering at the injection plunger. When the metering is performed in a state that the back pressure is set to be positive or the back pressure is set to 0 for the injection plunger and the mold is opened during the metering, because the pressure in the injection cylinder is higher than the atmospheric pressure, there is a problem that the molten resin will flow out from the injection nozzle (a drooping phenomenon), and the molten resin which flows out may be pinched by the mold in the next cycle, which will injure the mold body and cause damage.

In addition, in order to prevent the drooping phenomenon described above, after the plastication metering step is completed, a so-called suck-back step may be performed in which the injection plunger is slightly retreated before the injection step is started. However, because the suck-back step creates a negative pressure in the injection cylinder, air will enter from the injection nozzle and become bubbles to be mixed in the molten resin.

The disclosure is completed in view of this situation and has an object to provide an injection device and an injection control method which are capable of preventing a drooping phenomenon from an injection nozzle even during high cycle molding, and capable of appropriately plasticizing and molding a resin having poor thermal stability.

In addition, an object of the disclosure is to provide the injection device and the injection control method which are capable of preventing the drooping phenomenon even if a suck-back step is omitted.

As a result of diligently studying this problem, the inventor of the application invents an injection device which is capable of preventing a drooping phenomenon from an injection nozzle even during high cycle molding by actively retreating an injection plunger in a plastication metering step and devising an ingenuity for a stop position of the injection plunger when the injection plunger is retreated.

An injection device of the disclosure includes: an injection cylinder which accumulates a molding material and has an injection nozzle at the front; an injection plunger which is moved backward in the injection cylinder; an injection plunger driving device which moves the injection plunger backward; and an injection controller, wherein the injection controller retreats the injection plunger by the injection plunger driving device to perform metering in a plastication metering step of metering the molding material supplied into the injection cylinder.

Here, the "backward movement of the injection plunger" means that the injection plunger is moved in a direction opposite to the injection nozzle when viewed from a center of the injection cylinder.

According to the disclosure, a pressure in the injection cylinder can be prevented from rising by actively retreating the injection plunger by the injection plunger driving device in the plastication metering step, and as a result, a temperature in the injection cylinder can be suppressed from rising. Therefore, the problems can be solved such as decomposition of a resin having poor thermal stability at a high temperature, and the like. In addition, because the pressure in the injection cylinder is negative, the drooping phenomenon can be prevented even during the high cycle molding, and the suck-back step which is performed to prevent the drooping phenomenon can be omitted.

The injection device of the disclosure further includes a position detection device which detects a position of the injection plunger, and the injection controller calculates a retreat speed of the injection plunger in a plastication metering step of an n-th injection cycle from a metering time measured by the position detection device in a plastication metering step of an (n-1)-th injection cycle, and retreats the injection plunger at the retreat speed to perform the metering.

Furthermore, an injection control method of the disclosure includes a plastication metering step in which a molding material supplied into an injection cylinder having an injection nozzle at the front is metered while an injection plunger is retreated, wherein a retreat speed of the injection plunger in a plastication metering step of an n-th injection cycle is calculated from a metering time measured in a plastication metering step of an (n-1)-th injection cycle, and the injection plunger is retreated at the retreat speed to perform metering of the n-th injection cycle.

In the plastication metering step of the injection cycle, determination of the retreat speed of the injection plunger is an extremely difficult problem. When the retreat speed of the injection plunger is too fast, a resin density in the injection chamber becomes low, which causes a defective molded product. On the other hand, when the retreat speed of the injection plunger is too slow, the resin density in the injection chamber becomes excessive and the drooping phenomenon occurs.

According to the disclosure, the position detection device for detecting the position of the injection plunger is included, and the retreat speed of the injection plunger in the plastication metering step of the n-th injection cycle is calculated from the metering time measured in the plastication metering step of the (n-1)-th injection cycle and a metering end position of the injection plunger, and thus the injection plunger can be driven at an appropriate retreat speed, and the molding defect and the drooping phenomenon can be prevented.

In the injection device of the disclosure, the injection plunger is retreated at the retreat speed to a position at which the injection plunger has been moved from a pre-set metering end position toward the injection nozzle side by a certain width in the plastication metering step of the n-th injection cycle.

Furthermore, in the injection control method of the disclosure, the injection plunger is retreated at the retreat speed to a position at which the injection plunger has been moved from a metering end position toward the injection nozzle side by a certain width in the plastication metering step of the n-th injection cycle.

According to the disclosure, the injection plunger is temporarily stopped at the position before the metering end position of the previous injection cycle on the injection nozzle side, and at the end of the metering step of the molding material, an extrusion force (the resin pressure) of the molten resin is monitored and the injection plunger is retreated. Therefore, stability of the resin density in the injection cylinder can be improved.

By actively retreating the injection plunger during the plastication metering and further devising the retreat speed of the injection plunger, the injection device and the injection control method of the disclosure can prevent the drooping phenomenon from the injection nozzle even during high cycle molding to omit a suck-back step, and can appropriately mold even the resin having poor thermal stability.

DESCRIPTION OF THE EMBODIMENTS

Figure 1:
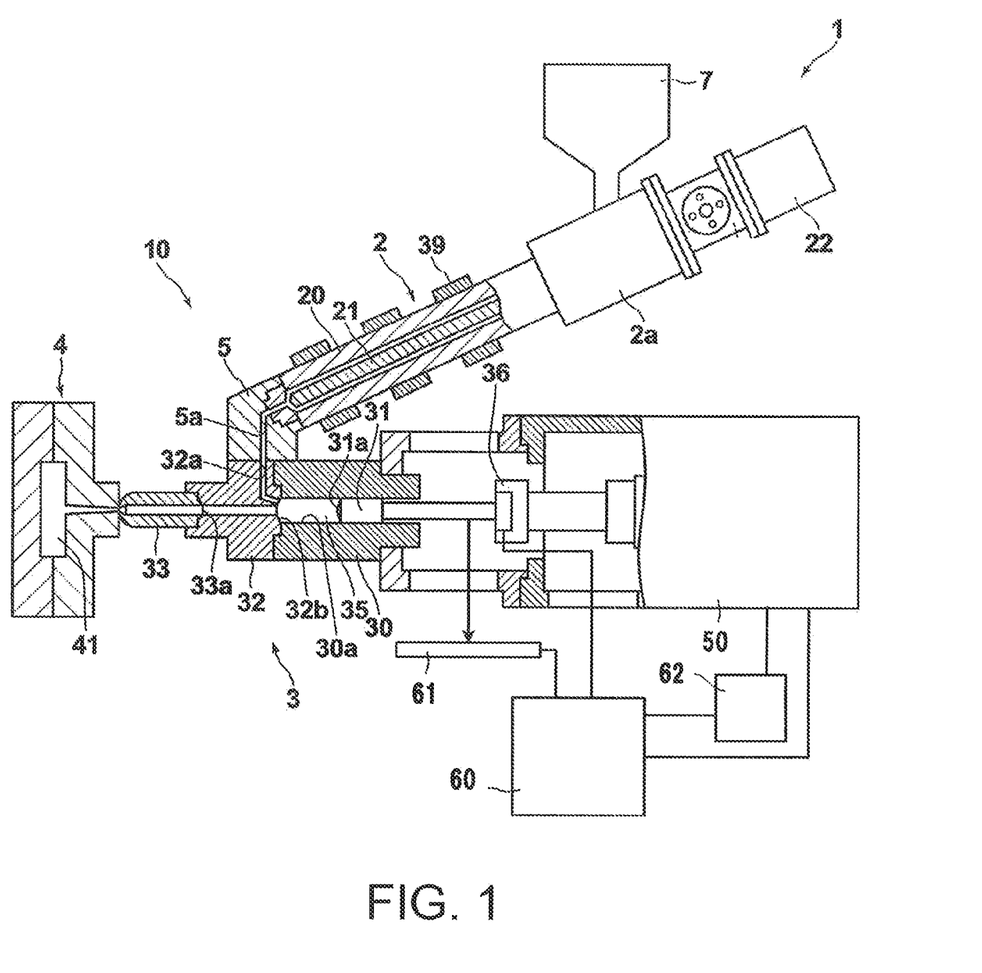
FIG. 1 is a schematic diagram showing an injection molding machine 1 according to an embodiment of the disclosure.
Figure 2:
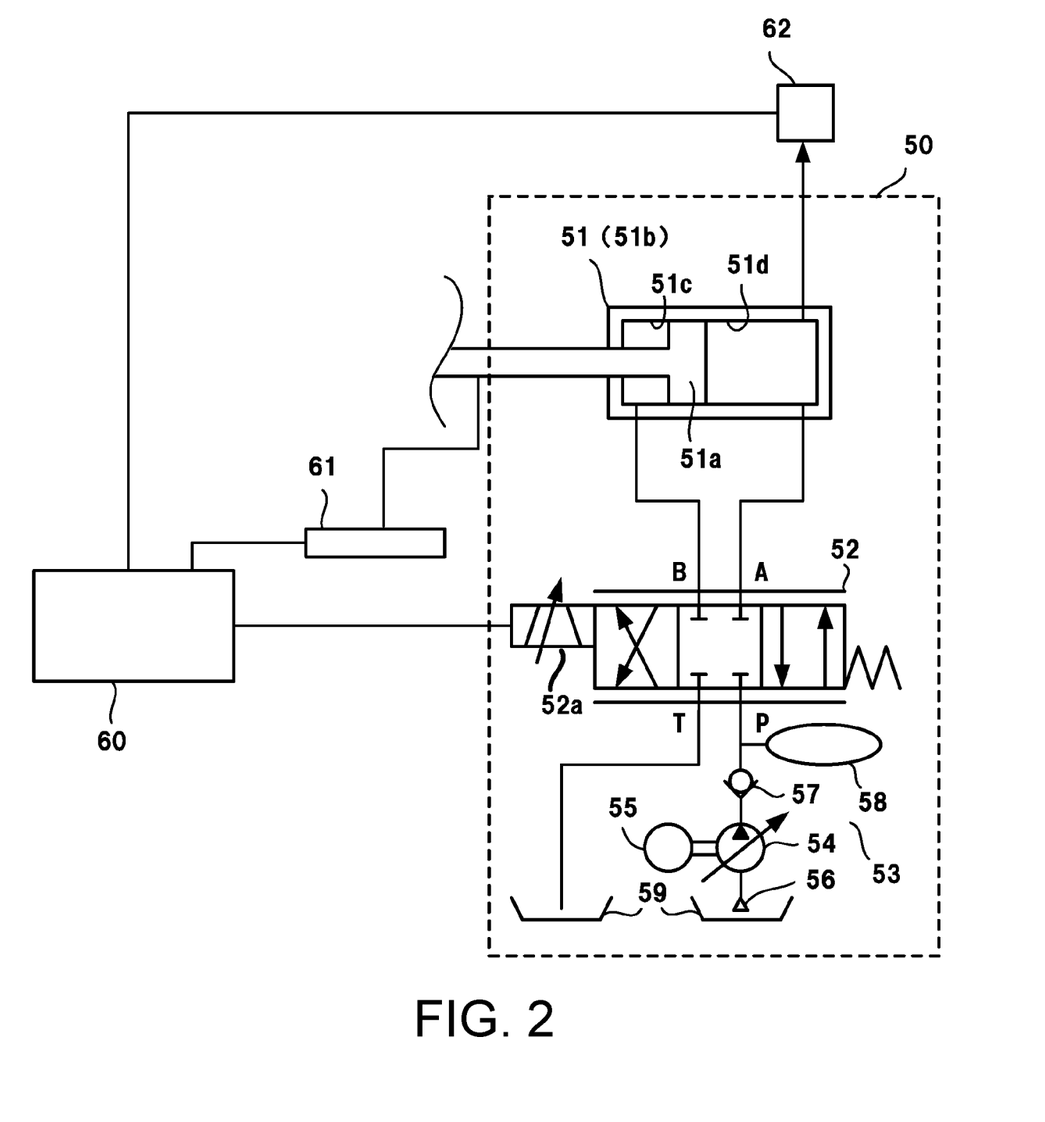
FIG. 2 is a schematic diagram showing a structure of an injection plunger driving device 50 (in a hydraulic manner) of the embodiment.

Embodiments of the disclosure are described below with reference to the drawings by taking a case where a molding material is a thermoplastic resin material as an example. FIG. 1 is a schematic configuration diagram showing an injection molding machine 1 according to an embodiment of the disclosure, and FIG. 2 is a schematic diagram showing a structure of an injection plunger driving device 50 (in a hydraulic manner) of the embodiment. The injection molding machine 1 of the disclosure includes a plastication unit 2 which plasticizes a molding material, an injection unit 3 which injects the plasticized molding material supplied from the plastication unit 2 into a cavity space 41 of a mold 4, a communication member 5 which communicates the plastication unit 2 and the injection unit 3, and a mold clamping device (not shown) to which the mold 4 is attached and which opens/closes the mold 4 and tightens the mold 4. Moreover, an injection device 10 is configured by the plastication unit 2, the injection unit 3, and the communication member 5. In the injection molding machine 1, the injection device 10 and the mold clamping device are arranged on a machine base (not shown) and are respectively driven and controlled by a control portion (not shown). Moreover, in the embodiment, a thermoplastic resin material is used and described below as the molding material, but the molding material may be a thermoplastic resin, a thermosetting resin, a metal, a composite material thereof, or the like, and the molding material is not particularly limited.

As shown in FIG. 1, the plastication unit 2 includes a plastication cylinder 20, a plastication screw (a screw) 21 inside the plastication cylinder 20, and a rotation driving device 22 which rotates the plastication screw 21. In addition, a hopper 7 is arranged to supply the resin material from a rear end side of the plastication cylinder 20. A material discharge opening of the hopper 7 and a material supply opening of the plastication cylinder 20 are communicated with each other by an inner hole of a hopper attachment member 2a. The inside of the plastication cylinder 20 of the plastication unit 2 communicates with an injection chamber 35 of the injection unit 3 via a communication passage 5a of the communication member 5.

In addition, a heating apparatus 39 (hereinafter, simply referred to as a heater) such as a band heater or the like is arranged on an outer periphery of the plastication cylinder 20, an injection cylinder 30, a nozzle cylinder 32, the communication member 5, an injection nozzle 33, and the like. For convenience, FIG. 1 shows a state in which the heater 39 is wound around the plastication cylinder 20, but the heater 39 is also wound around the injection cylinder 30, the nozzle cylinder 32, the communication member 5, and the injection nozzle 33.

When the plastication screw 21 is rotated in the plastication cylinder 20 by the rotation driving device 22, the resin material supplied from the hopper 7 are molten by heat applied from the heater 39 and shearing heat.

The injection unit 3 has the injection cylinder 30, an injection plunger (a plunger) 31 inside an injection cylinder hole 30a of the injection cylinder 30, the injection plunger driving device 50 which retreats the injection plunger 31, and the injection nozzle 33 which is attached to a front end of the injection cylinder 30 via the nozzle cylinder 32. A front wall 32b having a shape substantially equal to that of a distal end surface 31a of the injection plunger 31 is formed on an end surface of the nozzle cylinder 32 on the injection cylinder 30 side. An injection chamber 35 is formed as a space surrounded by the front wall 32b, the injection cylinder hole 30a of the injection cylinder 30, and the distal end surface 31a of the injection plunger 31. In addition, in the injection chamber 35, a communication passage 32a which communicates with the inside of the plastication cylinder 20 via the communication passage 5a of the communication member 5 and an injection hole 33a which communicates until a distal end of the injection nozzle 33 are opened.

In addition, the injection unit 3 includes the injection plunger driving device 50 which advances and retreats the injection plunger 31, a position detection device 61 which detects a position of the injection plunger 31, a pressure detection device 62 for detecting a pressure of the molding material in the injection cylinder 30, and an injection controller 60 which controls the injection plunger driving device 50.

The injection plunger driving device 50 of the injection unit 3 which is shown in FIG. 2 shows an example of a configuration in the case where the injection plunger 31 is driven in the hydraulic manner.

The injection plunger driving device 50 is a device for retreating the injection plunger 31, and the injection plunger 31 and a drive rod of the injection plunger driving device 50 are coupled by a coupling 36.

The injection plunger driving device 50 has a hydraulic cylinder 51 including a piston 51a and a cylinder 51b, a servo valve 52, a hydraulic supply source 53, and an oil tank 59. The hydraulic supply source 53 has a hydraulic pump 54, a pump motor 55 which drives the hydraulic pump 54, a filter 56 which is connected to a suction side of the hydraulic pump 54, a backflow prevention valve 57 which is connected to a delivery side of the hydraulic pump 54 and allows only the flow in the delivery direction, an accumulator 58 which is connected to a delivery side of the backflow prevention valve 57, and the like. In the injection plunger driving device 50 which drives the injection plunger 31 by the hydraulic cylinder 51, the accumulator 58 is included as the hydraulic supply source 53 in addition to the hydraulic pump 54 to supply operating oil which is accumulated in a large amount and a high pressure in the accumulator 58 to the hydraulic cylinder 51 at once, and thereby the injection plunger 31 can be driven at a high speed. The servo valve 52 is arranged between the accumulator 58 and the hydraulic cylinder 51, and a supply amount and a supply direction of the operating oil to the hydraulic cylinder 51 can be adjusted by controlling the drive of the servo valve 52 to drive the injection plunger 31 with high response and high precision.

The servo valve 52 is a four-port servo valve 52 having A, B, P, and T ports, the A port is connected to a rear oil chamber 51d (a piston head side oil chamber) of the hydraulic cylinder 51, the B port is connected to a front oil chamber 51c (a piston rod side oil chamber), the P port is connected to the accumulator 58, and the T port is connected to the oil tank 59. Although not shown, in the four-port servo valve 52, the A, B, P, and T ports are formed in a cylindrical sleeve, a spool displaced in an axial direction is accommodated inside the sleeve, and by moving a position of the spool, the connection between the ports is switched, an opening degree of an opening of each port (hereinafter, referred to as a spool opening degree) is variable to adjust a flow rate, and the opening of each port is closed to block the port. The spool opening degree is controlled so as to be directly proportional to a voltage value which is a command signal (hereinafter, referred to as a command value Qr) output from the injection controller 60 and input to the command value input portion 52a of the four-port servo valve 52. Moreover, according to the configuration of the injection device 10, the spool opening degree may also be controlled so as to be directly proportional to a current value instead of the voltage value.

For example, in the four-port servo valve 52 shown in FIG. 2, when the voltage value which is the command value Qr is zero, the spool is in a neutral position, that is, all the ports are in the blocked state. When the voltage value is positive, the P port is connected to the A port and the operating oil is supplied from the hydraulic supply source 53 to the rear oil chamber 51d of the hydraulic cylinder 51, and the T port is connected to the B port and the operating oil in the front oil chamber 51c of the hydraulic cylinder 51 is returned to the oil tank 59. When the voltage value is negative, the P port is connected to the B port and the operating oil is supplied from the hydraulic supply source 53 to the front oil chamber 51c of the hydraulic cylinder 51, and the T port is connected to the A port and the operating oil in the rear oil chamber 51d of the hydraulic cylinder 51 is returned to the oil tank 59. As the voltage value which is the command value Qr is reduced from zero to the negative direction, that is, the absolute value of the negative voltage value is increased, the spool opening degree is increased so as to increase a flow rate of the operating oil per unit time that flows from the hydraulic supply source 53 to the front oil chamber 51c of the hydraulic cylinder 51, and a retreat speed V of the injection plunger 31 is increased. Moreover, as in the embodiment, the voltage value is not always zero, and the voltage value may also be on either the positive or negative side. In addition, a moving direction of the spool with respect to the positive voltage value and the negative voltage value may also be opposite to the moving direction in the embodiment.

The injection controller 60 is a device for controlling the entire injection unit 3, an output side of the injection controller 60 is connected to the command value input portion 52a of the four-port servo valve 52, and an input side of the injection controller 60 is connected to the pressure detection device 62 for detecting an actual measurement value of a pressure of the rear oil chamber 51d of the hydraulic cylinder 51, that is, a pressure P applied to the injection plunger 31 by the molten resin. In addition, the position detection device 61 is connected to the input side of the injection controller 60. The injection controller 60 has a drive portion 66, a calculation portion 63, a storage portion 64, a timer 65, an input portion 68, and a display portion 67.

The drive portion 66 sends the command value Qr to the command value input portion 52a according to a value calculated by the calculation portion 63, retreats and stops the injection plunger 31, and changes the retreat speed of the injection plunger 31.

The calculation portion 63 calculates a stop position and a retreat speed of the injection plunger 31 in a plastication metering step in the next injection cycle.

The storage portion 64 stores various set values for performing injection molding. For example, a metering start position $S_S$, a metering end position $S_E$, an injection stroke D, a stop width W for stopping the injection plunger 31 before the metering end position $S_E$ (a distance between a stop position E and the metering end position $S_E$ of the injection plunger 31), and a resin pressure standard value $P_1$ are stored.

The timer 65 measures a time, and the timer 65 is used to perform measurement of a metering time.

The input portion 68 is an input device, for example, a keyboard, a touch panel which is arranged on a display surface of a display portion in a stacked manner, or the like, and the display portion 67 is configured by, for example, a display device such as a liquid crystal display or the like, and displays a setting screen and the like.

The position detection device 61 is a sensor which detects the actual measurement value of the position of the injection plunger 31, and various position detection sensors such as a linear encoder and the like can be adopted.

The pressure detection device 62 is a sensor for detecting the pressure (the resin pressure) of the molding material applied to the injection plunger 31, and may be a pressure sensor which is attached to a part of the cavity space in the mold such as a load cell clamped between the injection plunger 31 and the piston rod, a pressure sensor attached to the distal end of the injection plunger 31, or the like.

Figure 3:
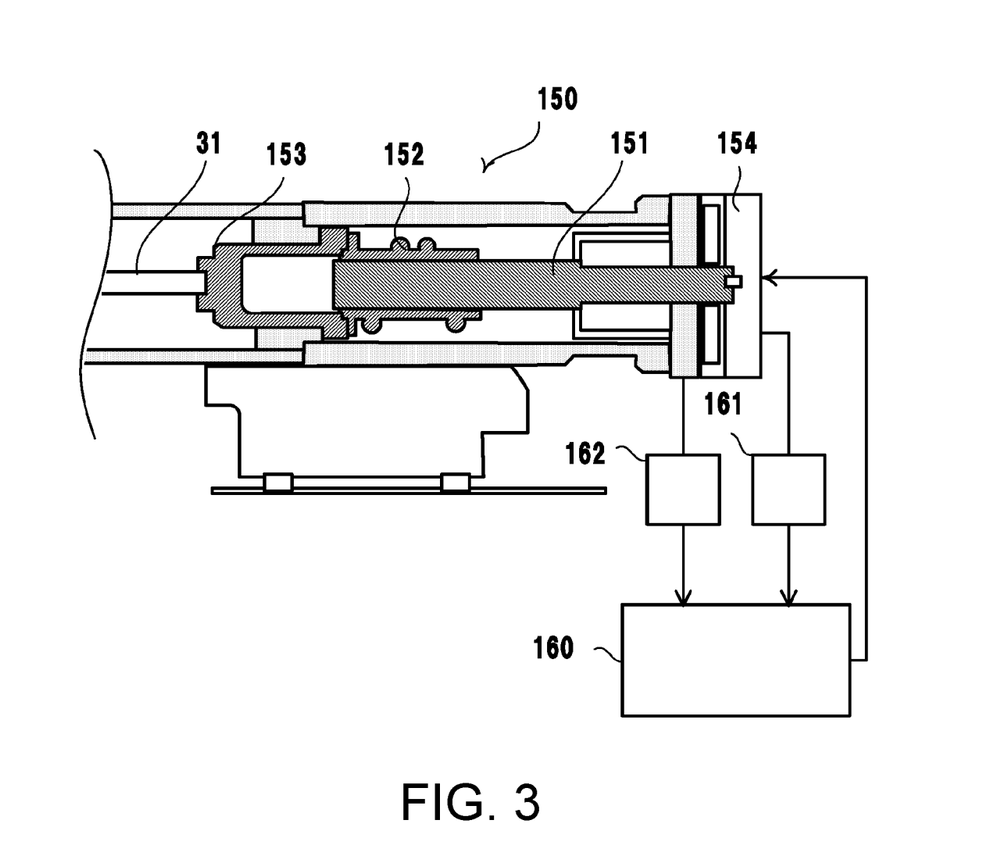
FIG. 3 is a schematic diagram showing a structure of an injection plunger driving device 150 (in an electric manner) of the embodiment.

An injection plunger driving device 150 of the injection unit 3 which is shown in FIG. 3 shows an example of a configuration in the case where the injection plunger 31 is driven in an electric manner. Although the injection plunger driving device 50 described above shows the example of the case where the injection plunger driving device 50 is driven in the hydraulic manner, because the injection plunger driving device 150 can also be driven electrically, the following description is given.

The injection plunger driving device 150 includes a motor 154, a ball screw 151 which is rotated by drive of the motor 154, a nut 152 for ball screw which is screwed with the ball screw 151, and a hollow joint 153 which is coupled to the nut 152. The ball screw 151, the nut 152, the joint 153, and the like are accommodated in a casing of the injection cylinder 30.

The end portion of the injection plunger 31 is coupled to the joint 153.

An AC servomotor is used as the motor 154. A rotation shaft of the motor 154 is connected with the ball screw 151, and the ball screw 151 is rotated by the drive of the motor 154. By changing a rotation speed of the motor 154 according to a command of an injection controller 160, a rotation speed of the ball screw 151 can be changed, and the moving speed (the retreat speed) of the injection plunger 31 connected to the nut 152 via the joint 153 can be changed.

An encoder which is a position detection device 161 is arranged in the motor 154 and detects the actual measurement value of the position of the injection plunger 31.

The ball screw 151 is screwed with the nut 152, the motor 154 is connected to a rear end of the ball screw 151, and a front end of the ball screw 151 penetrates into a hollow inside of the joint 153. The ball screw 151 is rotated by the motor 154, and thereby the nut 152 and the joint 153 connected to the nut 152 retreat, and the end portion of the ball screw 151 penetrates into the inside of the joint 153.

The ball screw 151 is supported to be rotated freely in the casing of the injection cylinder 30 by a bearing or the like.

The pressure detection device 162 such as the load cell or the like is arranged around the rear end of the ball screw 151, and detects the pressure received by the injection plunger 31 from the molten resin.

The injection controller 160 is a device for controlling the entire injection unit 3 and has a drive portion 166, the calculation portion 63, the storage portion 64, the timer 65 the input portion 68, and the display portion 67.

The drive portion 166 retreats and stops the injection plunger 31 by driving and stopping the motor 154 according to the value calculated by the calculation portion 163, and changes the rotation speed of the motor 154 to change the retreat speed of the injection plunger 31.

Because the calculation portion 63, the storage portion 64, the timer 65, the input portion 68, and the display portion 67 are the same as in the case of the hydraulic manner, description thereof is omitted.

(Flow of plastication metering step)

Next, a flow of the plastication metering step in the injection device 10 is described below. Here, the following description is given assuming that the injection plunger driving device 150 is driven electrically.

(Flow of plastication metering step of first injection cycle)

Figure 4:
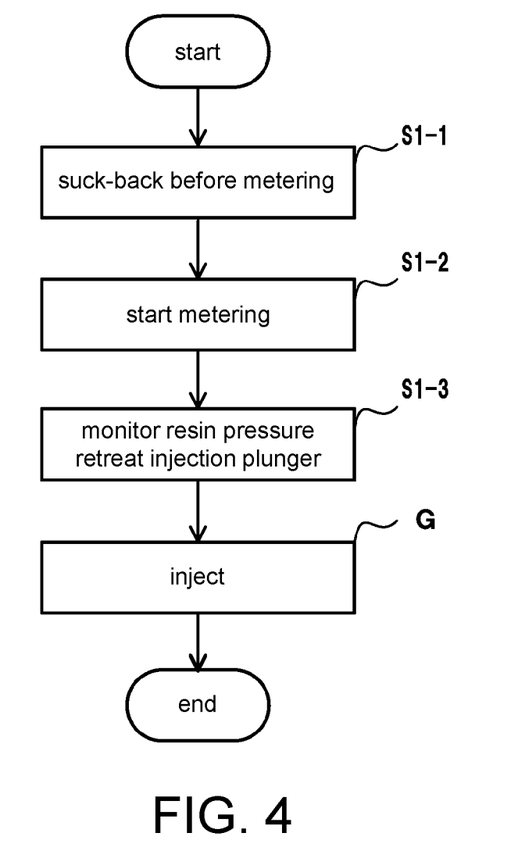
FIG. 4 is a flow chart showing a flow of a plastication metering step in a first injection cycle of the embodiment.

FIG. 4 is a flow chart showing a flow of a plastication metering step in a first injection cycle in the embodiment.

First, the injection plunger 31 is retreated to the metering start position $S_S$ (a suck-back step before metering: S1-1).

Next, the metering is started, the resin material is plastically molten by the shearing heat generated by the rotation of the plastication screw 21 and the heat generated by the heater 39 and is extruded toward the inside of the injection chamber 35 through the communication passages 5a and 32a by the rotation of the plastication screw 21 (S1-2).

The resin flowing into the injection chamber 35 reaches the metering start position $S_S$ and extrudes the injection plunger 31. At this time, the injection controller 160 monitors the resin pressure applied to the injection plunger 31 by the pressure detection device 162, controls the injection plunger 31 to be retreated little by little each time the resin pressure is received, and the injection plunger 31 is stopped at the metering end position $S_E$ (S1-3).

When the plastication metering step from S1-1 to S1-3 is completed, the injection plunger 31 is advanced, and the molten resin in the injection cylinder 30 is injected from the injection nozzle 33 toward the cavity space 41 in the mold 4 to be filled in the cavity space 41 (an injection step: G).

(Flow of plastication metering step of second injection cycle)

Figure 5:
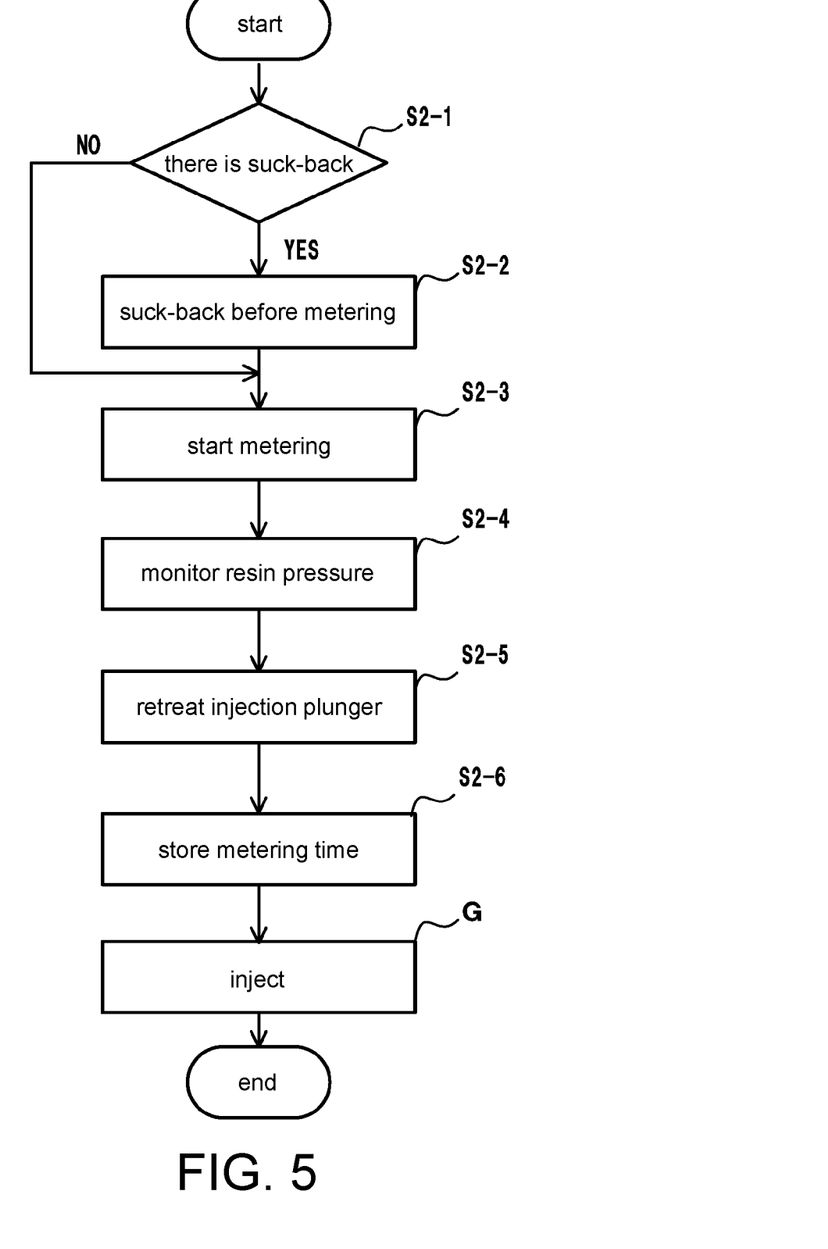
FIG. 5 is a flow chart showing a flow of a plastication metering step in a second injection cycle of the embodiment.
Figure 7:
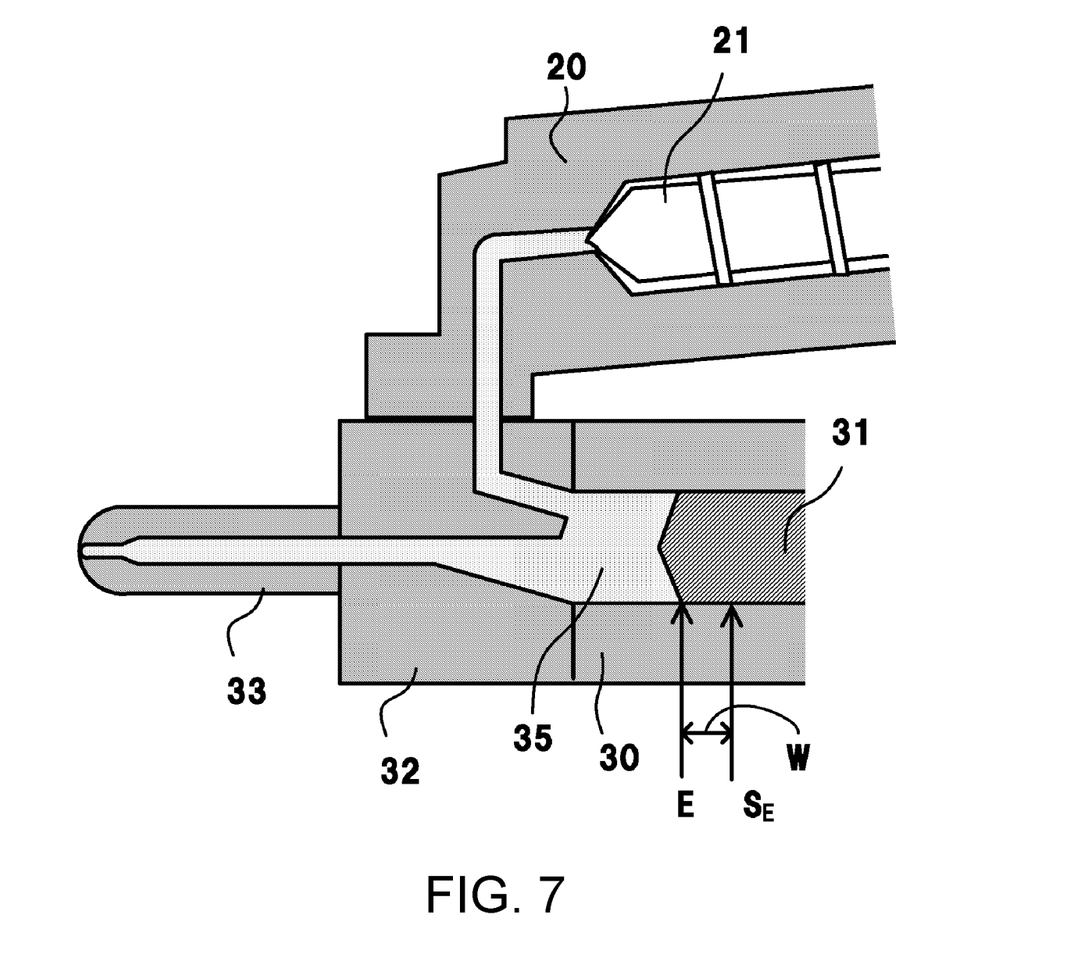
FIG. 7 is a pattern diagram showing a stop position E of an injection plunger 31 of the embodiment.

FIG. 5 is a flow chart showing a flow of a plastication metering step in a second injection cycle of the embodiment, and FIG. 7 is a pattern diagram showing the stop position E of the injection plunger 31 of the embodiment.

When the injection controller 160 is set to perform the suck-back before metering at first (S2-1), the injection controller 160 retreats the injection plunger 31 to the metering start position $S_S$ (a suck-back step before metering: S2-2).

Next, the metering is started, and the molten resin is extruded toward the inside of the injection chamber 35 through the communication passages 5a and 32a by the rotation of the plastication screw 21 (S2-3).

The resin flowing inside the injection chamber 35 comes into contact with the distal end surface of the injection plunger 31 and extrudes the injection plunger 31. The injection controller 160 monitors the resin pressure applied to the injection plunger 31 by the pressure detection device 162 (S2-4), and controls the injection plunger 31 to be retreated little by little each time the resin pressure is received (S2-5).

When the position detection device 161 detects that the injection plunger 31 reaches the metering end position $S_E$, the injection controller 160 stops the injection plunger 31 and stores a metering time $T_2$ taken from the start of the metering to the end of the metering (S2-6).

When the plastication metering step from S2-1 to S2-6 is completed, the injection plunger 31 is advanced, and the molten resin in the injection cylinder 30 is injected from the injection nozzle 33 toward the cavity space 41 in the mold 4 to be filled in the cavity space 41 (the injection step: G).

(Flow of plastication metering step of third and subsequent injection cycles)

Figure 6:
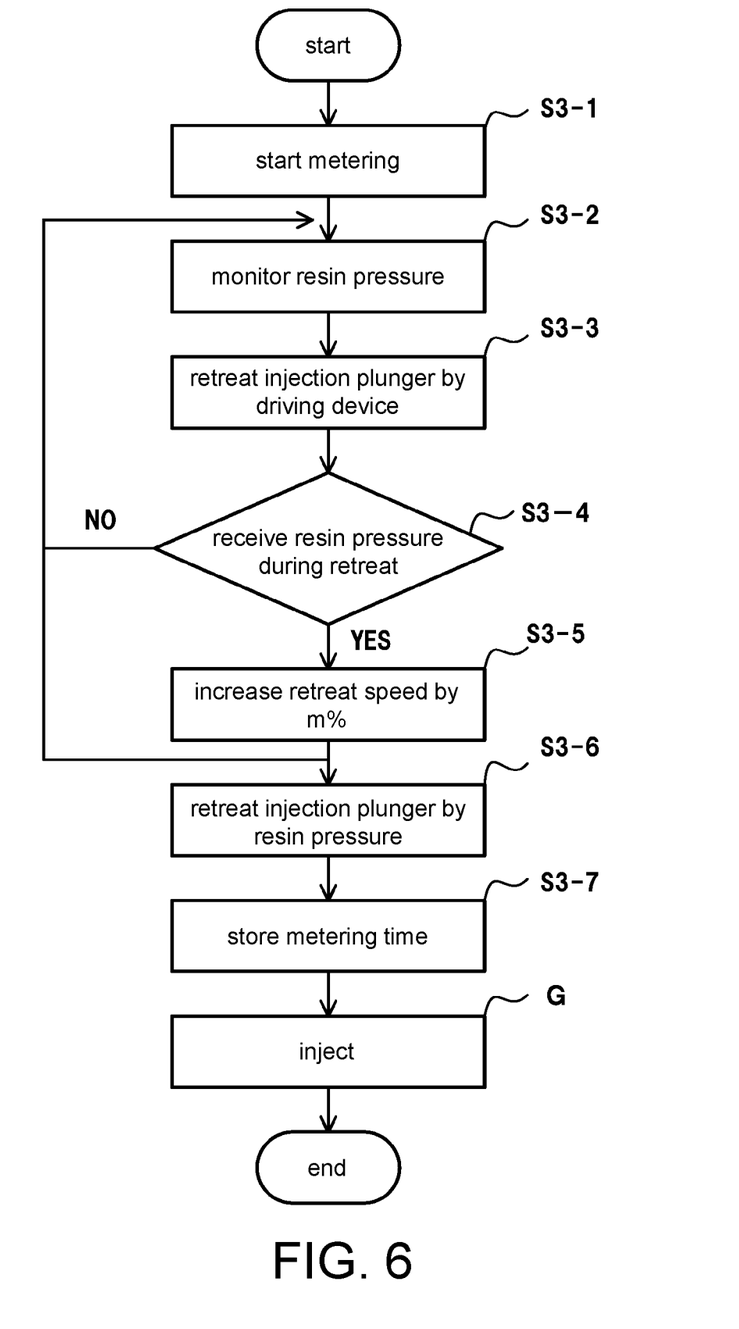
FIG. 6 is a flow chart showing a flow of a plastication metering step in third and subsequent injection cycles of the embodiment.

FIG. 6 is a flow chart showing a flow of a plastication metering step in third and subsequent injection cycles of the embodiment.

The injection controller 160 first calculates a retreat speed $V_3$ of the injection plunger 31 from the stored metering time $T_2$ (Equation 1). Here, D is the injection stroke.

In addition, the injection controller 160 reads the stop width W and the metering end position $S_E$, and calculates the stop position E of the injection plunger 31 which is a position before the metering end position $S_E$ by the stop width W (Equation 2).

[Equation 1]

$$V_3 = \frac{D}{T_2} \quad (1)$$

[Equation 2]

$$E = S_E - W \quad (2)$$

Then, the metering is started, and the molten resin is extruded toward the inside of the injection chamber 35 through the communication passages 5a and 32a by the rotation of the plastication screw 21 (S3-1).

The injection controller 160 monitors the resin pressure applied to the injection plunger 31 by the pressure detection device 162 (S3-2), and moves the injection plunger 31 at the retreat speed $V_3$ by the injection plunger driving device 150 (S3-3).

At this time, the injection controller 160 monitors whether or not the resin pressure having a value of the resin pressure standard value $P_1$ or more is received by the pressure detection device 162 (S3-4), and when the resin pressure of $P_1$ or more is received, a retreat speed which is obtained by increasing the retreat speed $V_3$ calculated using (Equation 1) by m % (m is an increasing rate) is defined as a new retreat speed $V_3$ (S3-5).

With respect to the injection controller 160, (S3-2) to (S3-5) are repeated until the position detection device 161 detects that the injection plunger 31 reaches the stop position E.

When the injection plunger 31 reaches the stop position E, this time the injection controller 160 monitors the resin pressure applied to the injection plunger 31 by the pressure detection device 162 and controls the injection plunger 31 to be retreated little by little each time the resin pressure is received (S3-6).

Normally, the speed of the resin flowing inside the injection chamber 35 is slower than the retreat speed $V_3$, and thus the injection plunger 31 is temporarily stopped at the stop position E until the resin pressure is received.

Then, when the position detection device 161 detects that the injection plunger 31 reaches the metering end position $S_E$, the injection controller 160 stops the injection plunger 31 and stores a metering time $T_3$ taken from the start of the metering to the end of the metering (S3-7).

When the plastication metering step including S3-1 to S3-7 is completed, the injection plunger 31 is advanced, and the molten resin in the injection cylinder 30 is injected from the injection nozzle 33 toward the cavity space 41 in the mold 4 to be filled in the cavity space 41 (the injection step: G).

The steps from S3-1 to S3-7 are also repeated in the fourth and subsequent injection cycles.

Specifically, when the plastication metering step which is in an n-th injection cycle is performed, the injection controller 160 first calculates a retreat speed $V_n$ of the injection plunger 31 of an n-th injection cycle from a metering time $T_{n-1}$ measured in a plastication metering step of an (n-1)-th injection cycle (Equation 3). Here, the n is an integer of 3 or more.

[Equation 3]

$$V_n = \frac{D}{T_{n-1}} \quad (3)$$

Then, the molten resin is extruded toward the inside of the injection chamber 35 through the communication passages 5a and 32a by the rotation of the plastication screw 21, and the injection controller 160 moves the injection plunger 31 at the retreat speed $V_n$ by the injection plunger driving device 150. When the position detection device 161 detects that the injection plunger 31 reaches the stop position E, thereafter, the injection plunger 31 is temporarily stopped until the injection plunger 31 receives the resin pressure. Other operations are the same as (S3-1) to (S3-7), and thus description thereof is omitted.

A reason why the retreat speed $V_n$ is calculated using the value measured in the (n-1)-th injection cycle and further the injection plunger 31 is stopped before the metering end position $S_E$ in the plastication metering step of the n-th injection cycle is as follows.

If the injection plunger 31 is moved at the retreat speed $V_n$ by the injection plunger driving device 50 in the plastication metering step of the n-th injection cycle, the retreat speed of the injection plunger 31 is faster than a flow speed of the molten resin supplied from the plastication unit 2 into the injection chamber 35, and a resin density in the injection chamber 35 will be low. When the injection is performed in this state, defective molding which is called a short shot is generated in which a part of the molded product is chipped and the shape is incomplete. On the other hand, when the retreat speed of the injection plunger 31 is set to be slow, this time the resin density in the injection chamber 35 becomes excessive, and a drooping phenomenon occurs in which the molten resin flows out from the injection nozzle 33.

Therefore, the stop position E of the injection plunger 31 in the plastication metering step of the n-th injection cycle is set before the metering end position $S_E$ by the stop width W, and further the retreat speed $V_n$ is calculated from the information of the previous injection cycle, and the retreat speed $V_n$ is increased by m % in real time when the calculated retreat speed $V_n$ is slow. Thereby, stability of the resin density in the injection cylinder 30 can be improved.

The flow of the plastication metering step in the injection device 10 is described assuming that the injection plunger driving device 150 is driven electrically, but when the injection plunger driving device 50 is driven in the hydraulic manner, the motion of the injection plunger 31 from the stop position E is different and is as follows. Specifically, in the case of the electric manner, when the position detection device detects that the injection plunger 31 reaches the stop position E, the resin pressure is monitored, and the retreat control of the injection plunger 31 is performed little by little. But in the case of the hydraulic manner, the drive of the injection plunger 31 is released, and the injection plunger 31 is retreated only by the resin pressure.

In the specification, the metering end position $S_E$ and the injection stroke D use stored fixed values, but when the metering end position $S_E$ and the injection stroke D are different for each injection cycle due to backflow prevention correction and the like, the metering end position $S_E$ and the injection stroke D which are changed for each injection cycle are used.

In the embodiment, the injection plunger driving devices 50 and 150 use the hydraulic manner and the electric manner, and a pneumatic manner may also be used.

In addition, in the embodiment, the screw preplasticating injection molding machine is described, and the embodiment can also be applied to an in-line screw injection device. Specifically, the control method of the injection plunger 31 in the plastication metering step of the embodiment can also be applied to control of an in-line screw.

The injection molding machine of the disclosure is not limited to the aforementioned embodiment, and can be appropriately changed within a range not deviating from the gist of the disclosure.

What is claimed is:

1. An injection device, comprising:
    an injection cylinder which accumulates a molding material and has an injection nozzle at the front;
    an injection plunger which is moved backward in the injection cylinder;
    an injection plunger driving device which moves the injection plunger backward; an injection controller; a position detection device which detects a position of the injection plunger; and
    a pressure detection device for detecting a resin pressure of the molding material in the injection cylinder, wherein
    the injection controller is configured to calculate a retreat speed of the injection plunger in a plastication metering step of an n-th injection cycle from a metering time of the injection plunger measured by the position detection device in a plastication metering step of an (n-1)-th injection cycle, and the injection controller is configured to directly control the injection plunger to retreat based on a value of the resin pressure and the retreat speed to perform metering, before a suck-back step can be omitted, wherein the n is an integer of 3 or more.

2. The injection device according to claim 1, wherein in the plastication metering step of the n-th injection cycle, the injection controller retreats the injection plunger at the retreat speed to a position at which the injection plunger has been moved from a pre-set metering end position toward the injection nozzle side by a certain width.

3. An injection control method of an injection device which is the injection device according to claim 1, comprising a plastication metering step in which the molding material supplied into the injection cylinder having the injection nozzle at the front is metered while the injection plunger is retreated, wherein
    a retreat speed of the injection plunger in a plastication metering step of the n-th injection cycle is calculated from the metering time measured in a plastication metering step of the (n-1)-th injection cycle, and the injection plunger is retreated at the retreat speed to perform metering of the n-th injection cycle, wherein n is an integer of 3 or more.

4. The injection control method of the injection device according to claim 3, wherein in the plastication metering step of the n-th injection cycle, the injection plunger is retreated at the retreat speed until the injection plunger reaches a position at which the injection plunger has been moved from a pre-set metering end position toward the injection nozzle side by a certain width.

* * * * *